June 23, 1953 D. SOUCEK 2,642,980
SHAKER CONVEYER FEEDING AND PROPORTIONING APPARATUS
Filed Aug. 15, 1951 2 Sheets-Sheet 1
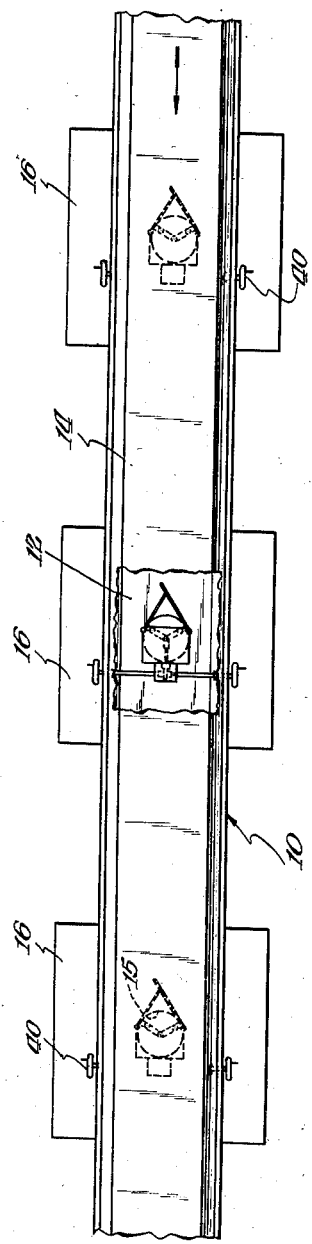
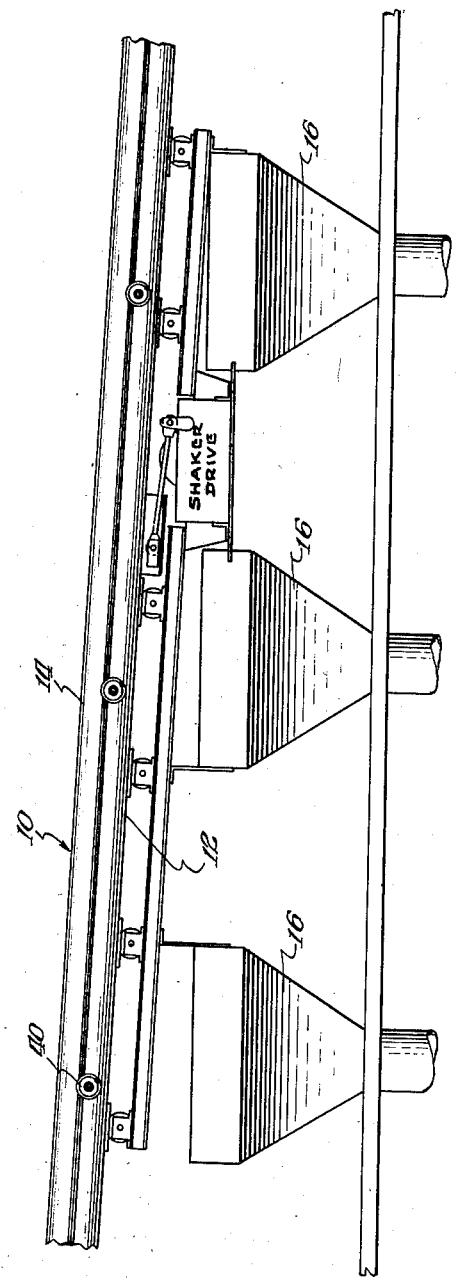
Inventor:
Dominick Soucek
By: Murray G. Gleeson
Attorney.

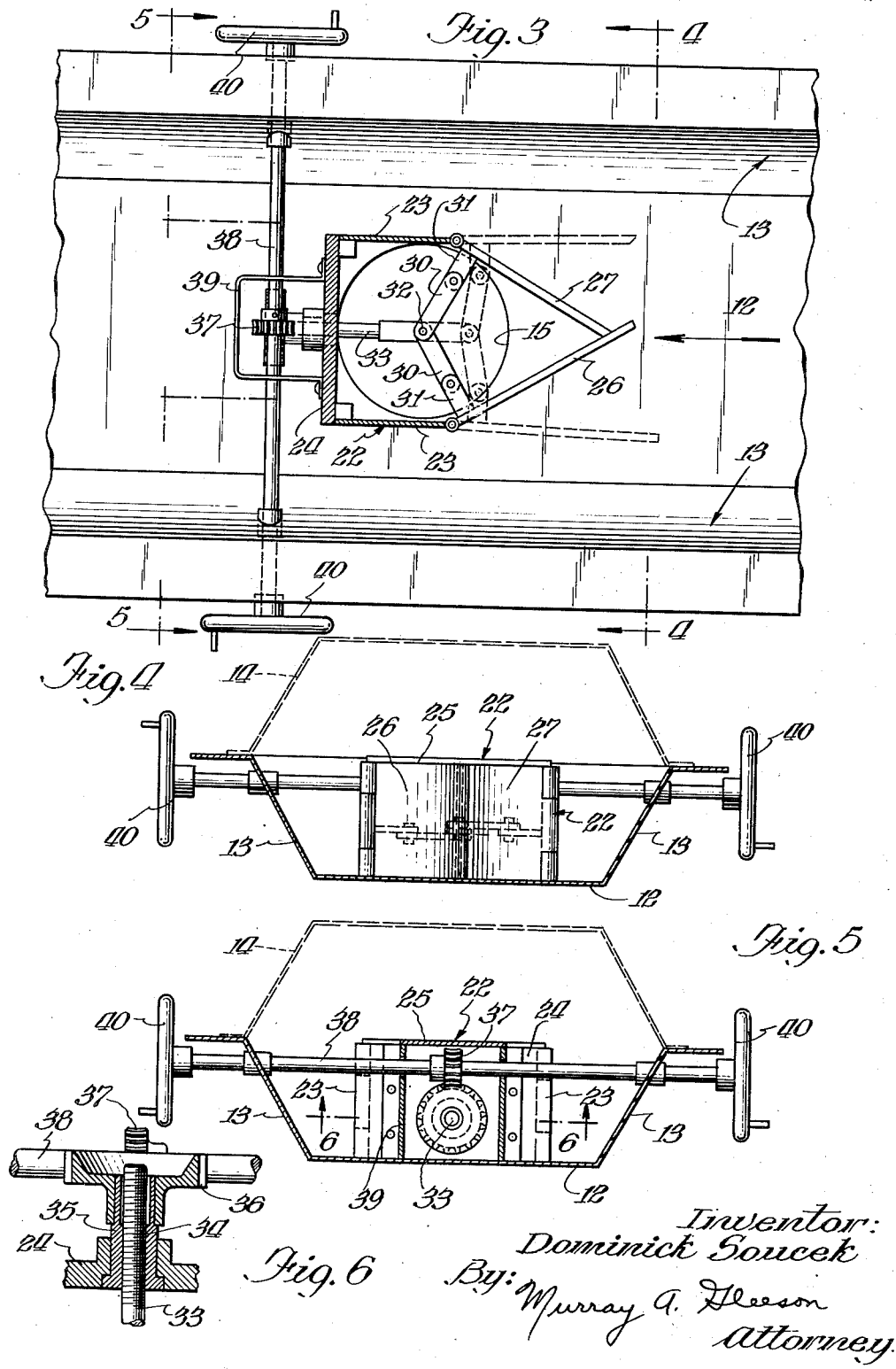

Patented June 23, 1953

2,642,980

UNITED STATES PATENT OFFICE 2,642,980

SHAKER CONVEYER FEEDING AND PROPORTIONING APPARATUS

Dominick Soucek, Cicero, Ill., assignor to Goodman Manufacturing Company, Chicago, Ill., a corporation of Illinois Application August 15, 1951, Serial No. 241,915

6 Claims. (Cl. 198—66)

This invention relates to improvements in shaker conveyor feeding and proportioning apparatus of the kind particularly adapted for discharging at certain use points, along a conveyor trough line, loose material of different grain sizes or weights which tend to become stratified when progressed along the trough line by a shaking motion. The manner in which such grains stratify, with the smaller or heavier grains filtering toward the bottom, leaving the larger or lighter grains toward the top of the stream, makes it difficult to divert or discharge the loose material in properly balanced proportions of grain sizes and weights at various use points along the trough line. Thus, conventional hopper type diverting devices, including a gate rising from the bottom of the trough, tend to divert the fines from the bottom of the stream, leaving the larger sizes to pass along the trough.

The principal object of the present invention is to provide a novel form of diverting mechanism for one or more use or discharge stations along a shaker conveyor trough line, wherein a representative cross section of the stream may be diverted or discharged at each such station.

A further object of the invention is to provide a diverting mechanism of the kind referred to above, including two upright gates hinged on vertical axes and adjustable toward and away from each other to vary the amount of material to be diverted, in properly balanced proportion of size and weight, in all positions of adjustment of said gates.

A still further object is to provide a form and arrangement of such gates to insure self-cleaning, non-clogging operation thereof, especially when closing the gates.

Other objects and advantages of the invention will appear from time to time as the following description proceeds.

The invention may best be understood by reference to the accompanying drawings, in which:

Figure 1 is a plan view showing a section of a shaker trough line constructed in accordance with my invention, with a part broken away to show the diverting devices at one of the discharge stations;

Figure 2 is a side view of the trough line shown in Figure 1;

Figure 3 is an enlarged fragmentary detail plan view of a portion of the trough, with the cover removed showing one of the diverting devices in horizontal section;

Figure 4 is a transverse section taken on line 4—4 of Figure 3;

Figure 5 is a section taken on line 5—5 of Figure 3;

Figure 6 is a detail section taken longitudinally of the threaded end of the push rod, taken generally on line 6—6 of Figure 5.

Referring now to details of the embodiment of my invention shown in the drawings, a shaker conveyor trough, indicated generally at 10, is of the enclosed type, adapted for use for feeding a mixture of pebble lime and coke to a carbide furnace, wherein the mixture is to be fed to a plurality of hoppers 16 around the sides of the furnace at a uniform rate and proportion of the mixture. For illustrative purposes, a section only of the conveyor trough line 10 is shown, consisting of a pan bottom 12, outwardly flared side walls 13, and enclosed by a cover 14. The bottom 12 of the pan has a plurality of discharge openings 15 at spaced points along its median line, in position to discharge the loose material mixture into hoppers 16. The hopper mouths are horizontally elongated to register with the respective discharge openings in all positions of longitudinal shaking motion of the trough line.

Referring now more particularly to the novel form of diverting mechanism shown in detail in Figures 3, 4 and 5, a housing indicated generally at 22 is fixed over each discharge opening 15, including two upright partitions 23, 23 spaced from the opposite side walls 13 of the trough, and a connected wall 24 on the rear or downstream side of the housing. An upper cross support, herein consisting of a cover plate 25, spans the side walls 23. Two upright gates 26 and 27 are hinged on upright axes along the front edges of the side walls, so as to swing toward and away from each other at their free ends in the direction opposed to the normal flow of material; that is to say, toward the upstream end of the trough. One of the gates 26 is slightly longer than the second gate 27, so as to overlap and project beyond the end of said second gate when the two gates are moved to closed position relative to each other at substantially equal angles to the normal direction of flow of material, as shown in Figure 3.

The gates 26 and 27 and housing 22 to which they are hinged are preferably of sufficient height to extend above the top of a normal stream of loose material passed along the trough so that, when the gates are opened, they extract and divert a representative cross section of various grain size and weight of material from the main stream into the housing for discharge through the discharge opening 15 in said housing. The remaining loose material will pass on down the stream, the portion of the material engaging the outer faces of the gates being diverted around opposite sides of the housing. Thus, the amount of loose material received in each housing is dependent upon the size of the opening between the free ends of the gates.

The arrangement whereby the gate 26 is slightly longer than gate 27, so as to extend upstream beyond the apex formed by the gates when moved in closed position as shown in Figure 3, renders the gate self-cleaning, so that lumps will not tend to be caught between them to prevent closing when desired. Thus, as seen in Figure 3, the free end of the shorter gate 27 will in effect be in the "shadow" of the end of the longer gate 26 with respect to the material passing along the trough. This stops most of the flow through the gates just before they become fully closed, so as to prevent large lumps being caught between them to hold the gates open. This arrangement also tends to divert pressure from the shorter gate 27 when they are in closed position so as to facilitate the opening of the gates.

Means are provided for adjusting the opening of each set of gates 26 and 27 of the several housings 22, so as to insure the diversion of the loose material in desired proportions at each discharge opening 15. In the illustrative form of adjusting means shown in the drawings, a pair of links 30, 30 are pivotally connected at their outer ends to lugs 31, 31 fixed to the inner faces of the gates 26 and 27, adjacent the points of pivotal connection thereon, and the inner ends of the links 30 are pivotally connected to a common pivot pin 32 on the front end of a push rod 33. The push rod 33 has a rear end portion 34 threaded in a sleeve 35 which is rotatably mounted in the rear wall 24 of the housing 22. A helical gear 36 is fixed on the outer end of the sleeve 35 and is engaged by a helical or worm gear indicated in conventionalized manner at 37 on a control shaft 38 extending transversely of the trough.

The gearing just described may be enclosed within a casing 39 fixed to the rear face of the housing 22 to protect said gearing from dust and dirt. The control shaft 38 may extend, in opposite directions, through the housing 39 and also through the side walls 13, 13 of the trough, where suitable hand wheels 40, 40 may be fixed on each end of the control shaft 38 for manual adjustment of the gates from either side of the trough.

The arrangement is such that the gates 26 and 27 of each housing 22 will be simultaneously opened or closed toward and away from each other to any desired degree, so that the proper proportion of the entire stream of material passing along the trough will be diverted to each discharge opening 15 for delivery to its respective hopper at the several use stations along the trough.

It will be understood that the diverting and proportioning devices associated with each discharge opening 15 and housing 22, as above described, are particularly adapted for use in relatively long trough lines where a substantial number of such diverting and proportioning devices may be employed at spaced intervals therealong. For this purpose, the trough line may consist either of a single shaker trough or of a plurality of separate shaker troughs arranged in the usual cascading relation with each other. Thus, when a large number of discharge or use stations are employed, a predetermined proportion of loose material passing along the trough line may be diverted and discharged at each use point, depending upon the adjustment of the gate opening for each discharge opening. Manifestly, as the stream is gradually diminished by removing a portion thereof at each use station, it will be necessary to increase the size of the gate opening at successive stations where a substantial uniform supply of loose material at each use station is desired. Therefore, it is usually preferable to provide a manually adjustable control for the several gates to compensate for variations in the size of the stream of material, as described. In all cases, however, it will be understood that the same proportion of light and heavy grain sizes can be maintained substantially uniformly at each discharge station throughout the length of the trough line.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. Shaker conveyor feeding and proportioning apparatus for supplying a plurality of use points with predetermined proportions of granular material comprising an elongated trough line extending past said use points and having drive means operably connected thereto for imparting material-moving reciprocatory movement thereto, said trough line having adjacent at least one of said use points flow-diverting means including a pair of side walls upstanding from the bottom of said trough line and spaced inwardly from the sides of the latter to define a transfer compartment therebetween and bypass passages therearound, said side walls closing the top and downstream sides of said compartment, said side walls having a pair of upstanding gates hinged thereto for swinging movement about vertical axes between the cover and trough bottom and closable against one another in the shape of a V having its apex centrally located within said trough and extending in an upstream direction, one of said gates extending substantially beyond said apex when closed in order to facilitate the initial opening and closing operations, said trough line having an opening in the bottom of said compartment, a longitudinally movable operating shaft supported within said compartment, link means connecting said gates to said shaft, a rotatable shaft carried by said trough line and transversely supported relative to said operating shaft, and an operable connection between said shafts for longitudinally shifting said operating shaft responsive to rotation of said rotatable shaft, the latter extending exteriorly of said trough line and having exterior means for manually rotating it for adjusting the degree of opening of said gate.

2. Shaker conveyor feeding and proportioning apparatus for supplying a plurality of use points with predetermined proportions of granular material comprising an elongated trough line extending past said use points and flow-diverting means at at least one use point including upstanding walls mounted on the bottom of the trough line defining a transfer compartment therein, means for imparting material-moving shaking movement to said trough line, said walls having a pair of upstanding hinged gates between the cover and trough and closable against one another in the shape of a V having its apex extending in an upstream direction, one of said gates extending beyond said apex when closed to facilitate opening and closing, said trough line having an opening in the bottom of said compartment, a movable operating shaft supported within said compartment for movement relative to said gates, connecting means between each gate and said shaft, a rotatable shaft transversely supported on said trough line and gear means acting between said shafts for moving said operating shaft responsive to rotation of said rotatable shaft to open and close said gates, the rotatable shaft extending exteriorly of said trough line and having exterior means for rotating it to open and close said gates.

3. Shaker conveyor feeding and proportioning apparatus for supplying a plurality of use points with predetermined proportions of granular material comprising an elongated trough line extending past said use points and flow-diverting means adjacent at least one use point including upstanding walls mounted on the bottom of the trough line defining a transfer compartment therein and bypass passages therearound between the sides of the trough line, said walls having a pair of upstanding hinged gates between the cover and trough and closable against one another in the shape of a V having its apex extending in an upstream direction, one of said gates extending laterally beyond said apex when closed to facilitate opening and closing of the gates, said trough line having an opening in the bottom of said compartment positioned to discharge into said adjacent use point, a pair of link members pivotally interconnected with one another and with said gates respectively, a rotatable adjusting shaft transversely supported in said trough line, and operating connecting means between said link members and said rotatable shaft, the latter extending exteriorly of said trough line and having means thereon for manually rotating it for adjusting the degree of opening of said gates.

4. Shaker conveyor feeding and proportioning apparatus for supplying a plurality of use points with predetermined proportions of granular material comprising an elongated trough line extending past said use points and flow-diverting means adjacent at least one use point including upstanding walls mounted on the bottom of the trough line defining a transfer compartment therein and bypass passages therearound between the sides of the trough line, said walls having a pair of upstanding hinged gates closable against one another at an acute angle having its apex extending in an upstream direction, said trough line having an opening in the bottom of said compartment discharging into said adjacent use point, an operating shaft journalled in said compartment walls for longitudinal movement relative to the trough line, link means connecting each gate to said shaft, a rotatable shaft carried by said trough line and transversely supported relative to said opening shaft, and connecting means acting between said shafts for shifting said operating shaft longitudinally responsive to rotation of said rotatable shaft, the latter extending exteriorly of said trough line and having means thereon for manually rotating it for adjusting the degree of opening of said gates.

5. Shaker conveyor feeding and proportioning apparatus for supplying a plurality of use points with predetermined proportions of granular material comprising an elongated trough line extending past said use points and flow-diverting means adjacent at least one of said use points including upstanding walls mounted on the bottom of the trough line defining a transfer compartment therein, said walls having a pair of vertically hinged upstanding gates arcuately slidable across the trough and closable against one another at an arcuate angle having its apex extending in an upstream direction, one of said gates extending laterally beyond said apex when closed to facilitate their opening and closing, said trough line having a discharge opening in the bottom of said compartment positioned to discharge into said adjacent use point, each of said gates having an inwardly extending ear with a link pivotally mounted thereon, each of said links being pivoted to an operating shaft journalled within said walls for longitudinal shifting movement, and manually operable means extending exteriorly of said trough line for shifting said operating shaft to open and close said gates.

6. Shaker conveyor feeding and proportioning apparatus for supplying a plurality of use points with predetermined proportions of granular material comprising an elongated trough line extending past said use points and flow-diverting means adjacent a plurality of said use points each including upstanding walls mounted on the bottom of the trough line defining a transfer compartment therein, said walls having a pair of vertically hinged upstanding gates arcuately slidable across the trough and closable against one another at an acute angle having its apex extending in an upstream direction, said trough line having a discharge opening in the bottom of each of said compartments positioned to discharge into the adjacent use point, linkage means connecting said gates for simultaneous opening and closing movement, and manually operable means supported on said trough line for opening and closing said gates.

DOMINICK SOUCEK.

References Cited in the file of this patent

UNITED STATES PATENTS

| Number | Name | Date |
|---|---|---|
| 944,317 | Carney | Dec. 28, 1909 |
| 954,294 | Hunt | Apr. 5, 1910 |
| 2,386,717 | Sample | Oct. 9, 1945 |
| 2,557,016 | Smith | June 12, 1951 |